M. HANAWAY.
VEHICLE COVER.
APPLICATION FILED JULY 14, 1917.

1,263,759.

Patented Apr. 23, 1918.
2 SHEETS—SHEET 1.

WITNESSES

INVENTOR
Michael Hanaway
BY
ATTORNEY

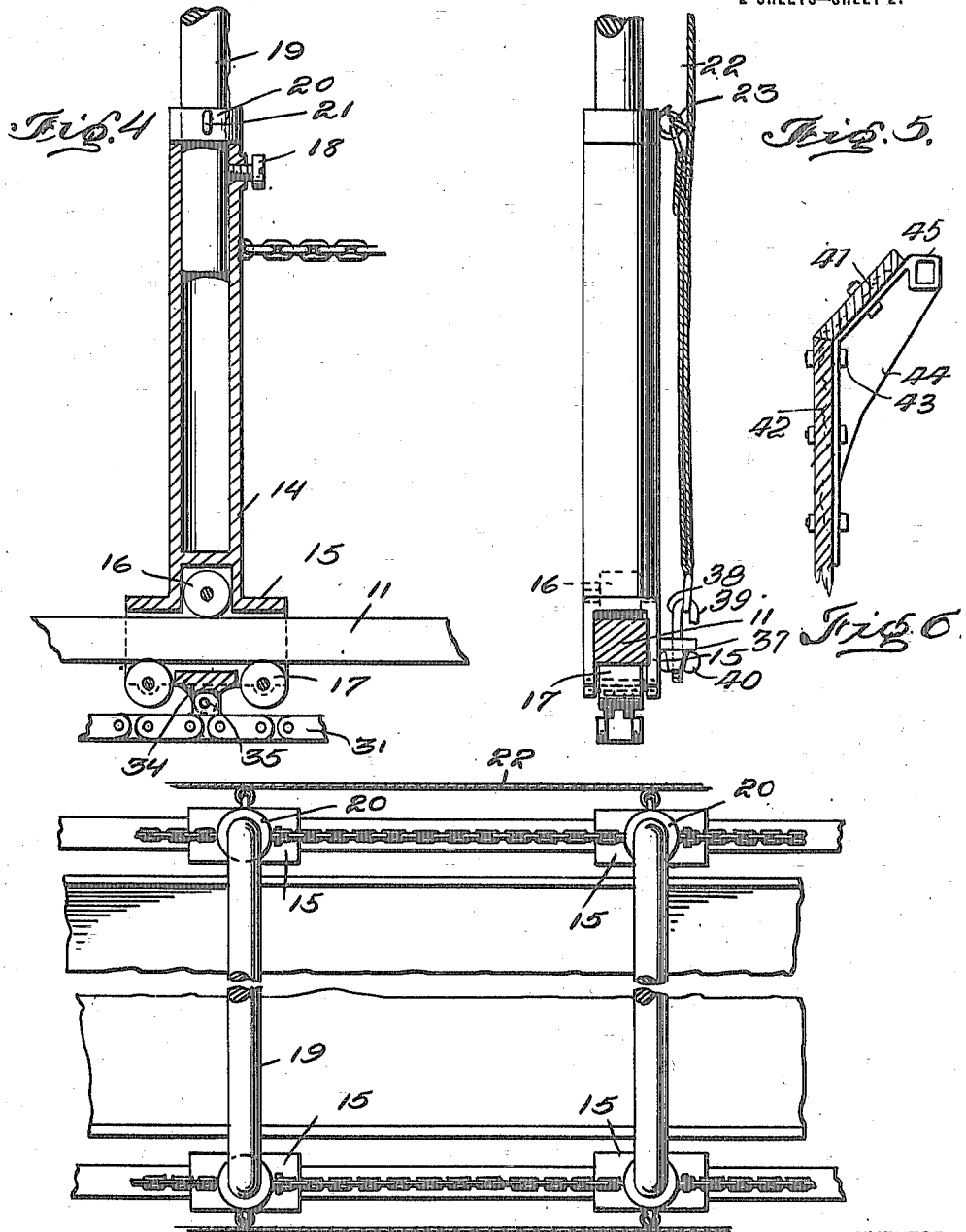

UNITED STATES PATENT OFFICE.

MICHAEL HANAWAY, OF ANACONDA, MONTANA.

VEHICLE-COVER.

1,263,759.  Specification of Letters Patent.  Patented Apr. 23, 1918.

Application filed July 14, 1917.  Serial No. 180,554.

*To all whom it may concern:*

Be it known that I, MICHAEL HANAWAY, a citizen of the United States, residing at Anaconda, in the county of Deerlodge and State of Montana, have invented certain new and useful Improvements in Vehicle-Covers, of which the following is a specification.

This invention has relation to covers for vehicles such as motor vehicles, motor trucks, cars, wagons, or the like; and has for an object to provide a cover adapted to be readily extended over the vehicle or to be moved back to expose the interior thereof.

Another object of the invention is to provide a cover for a vehicle and a plurality of supports therefor connected in a manner to permit movement of the supports into properly spaced relation to form a support for the cover, and means to move the supports toward one end of the vehicle to fold the cover whereby to expose the interior thereof.

A still further object of the invention is to provide a cover for a vehicle and a plurality of supports therefor each support being adjustable vertically to dispose the cover at different heights above the vehicle body, and to adjust the same to many styles of vehicles.

In addition to the foregoing my invention comprehends improvements in the details of construction and arrangement of the parts to be hereinafter more fully described and particularly set forth in the appended claim.

In the accompanying drawings in which similar and corresponding parts are designated by the same characters of reference throughout the several views in which they appear:—

Fig. 3, is a view of a pair of the top supports in plan.

Fig. 4, is a detail view in section of the lower portion of one of the cover supports.

Fig. 5, is a view similar to the preceding figure taken at right angles thereto, and Fig. 6, is a view of a modified form of end supporting brackets.

Figure 1:
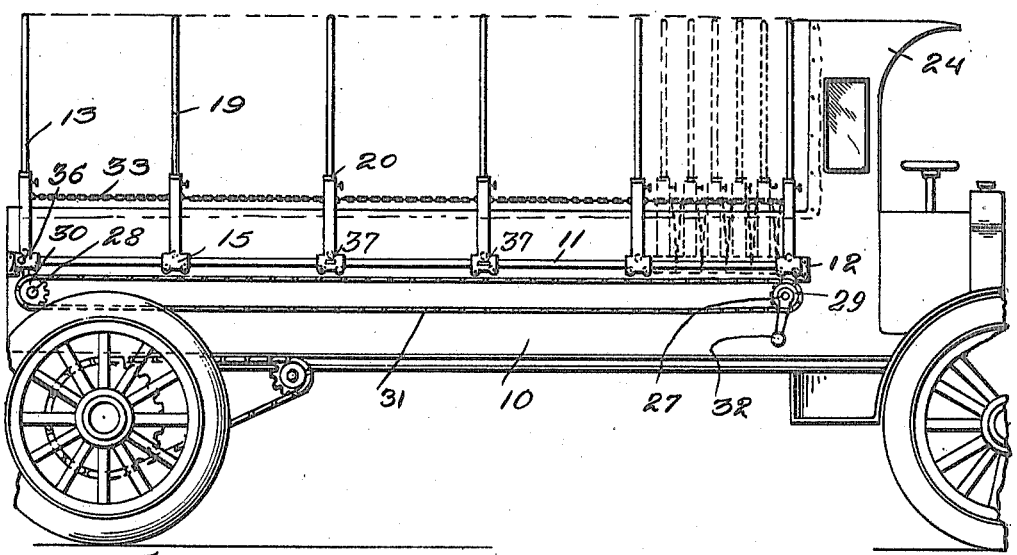
Figure 1, is a view in side elevation of a vehicle illustrating the application thereto of a top or cover constructed in accordance with my invention.
Figure 2:
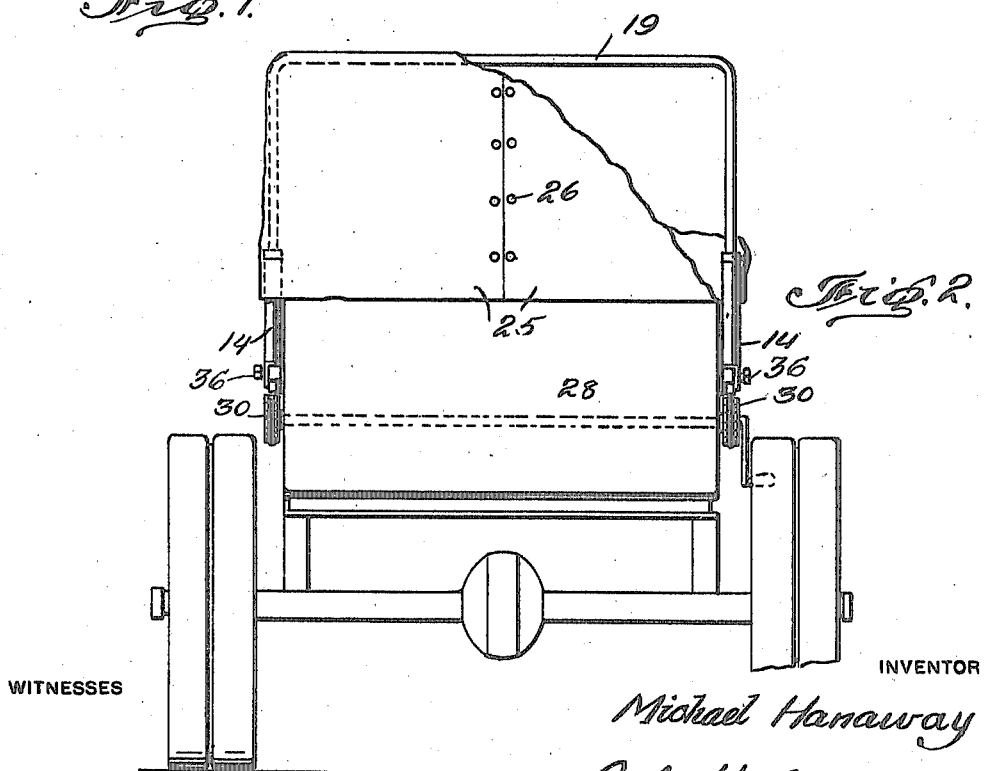
Fig. 2, is a view of the vehicle in end elevation.

With reference to the drawings, 10 indicates the body of a motor truck to the side of which there is secured a longitudinally extending bar 11 rectangular in cross section, mounted at their ends in brackets 12. A plurality of arch shaped supports 13 are extended across the vehicle transversely thereof and supported at their terminals upon the bar 11, each support comprising a pair of tubular members 14 formed at their lower ends with transversely extending branches 15 apertured to receive the rectangular bars. Each tubular member is provided with a roller 16 journaled interiorly thereof and adapted to rest upon the top of the bar 11, and a pair of rollers 17 journaled to bear against the under side of said bar 11 substantially as shown in Fig. 4. The upper end of each tubular member is formed with a lateral threaded opening in which to receive a set screw 18. Each support further comprises a U-shaped bar 19 which is inverted and its terminals disposed within the upper end of the tubular members 14, so as to dispose said member 19 transversely across the vehicle, the U-shaped members being supported in vertically adjusted position by tightening the set screws 18. The terminals of each arch support 19 are provided with a collar 20 which rest upon the upper ends of the tubular members 14 and which are provided with eyes 21 whereby the cover 22 may be secured thereto, the cover having a plurality of rings 23 secured to its longitudinal edges to engage in the eyes 21 which may be in the nature of snap hooks. The forward end of the cover may be secured to the canopy 24 usually provided upon a vehicle of this description, while the sides of the canopy are extended beyond the top portion of the rear end of the vehicle to form flaps 25 which are brought together and held by means of suitable fasteners 26 to form a closure for the end of the vehicle.

A shaft 27 is extended transversely of the vehicle at the forward end thereof and journaled in the side of the vehicle body in the same horizontal plane with a similar shaft 28 journaled at the rear end of the vehicle body and disposed in parallelism to the first mentioned shaft. The outer projecting ends of the shaft carry sprocket wheels, those upon the front shaft being designated 29, and those upon the rear shaft 30. The sprocket wheels at each side of the vehicle are connected by means of a chain 31, and the forward shaft is provided upon one end with a crank 32 whereby to rotate the same.

Thus it will be seen that a plurality of cover supports are mounted upon the bars 11, each support being a duplicate in construction. The tubular sections of the support are furthermore connected one to another by means of sections of chain or the like 33, and the support nearest the rear of the vehicle is formed with apertured lugs 34 which project downward from each tubular member of said support for engagement with lugs 35 formed upon the chains 31.

It will be seen that if the supports are spaced from one end of the vehicle to the other as shown in full lines in Fig. 1, the cover is extended so as to cover the body of the vehicle. To collapse the cover it is but necessary to rotate the forward shaft 27 by means of its crank so as to move the upper stretches of the chain in a forward direction whereupon the rearmost support 13 will be moved forward until it engages the next adjacent support which will be carried along and the operation continued, one support after another being picked up until they are all moved toward the front end of the vehicle as shown in dotted lines. The cover will then be folded in a series of folds which will be disposed between the arched supports. To extend the cover obviously, it is but necessary to rotate the forward shaft in a reverse direction whereupon the rearmost support will be moved first, until the chain connecting the same with the next support is placed under strain whereupon the next support will be carried rearward and the operation continued until the supports are separated to the fullest extent permitted by the chain 33.

To retain the arched supports in proper spaced relation when the cover is unfolded, the end support adjacent the rear end of the vehicle is provided with set screws 36 which enter the T-shaped portion 15 thereof to engage the rectangular bars 11. I have also disclosed in Fig. 5 a means whereby the cover 22 may be secured at its edges and to retain the cover against flapping in the wind. To this end I have provided a lug 37 upon the terminals of each arched support apertured to receive a bolt 38 having its upper end hook shaped as at 39 to receive the rings of the cover, a wing nut 40 being applied to the lower end of the bolt as indicated. By tightening the nut, strain may be applied to the cover so as to more securely hold the same in place.

I have illustrated in Fig. 6 a modified form of end bracket to support the rectangular rods 11 on a vehicle having outwardly diverging top boards 41 mounted on the side members 42 of the wagon body. This bracket is secured to the exterior of the wagon body by means of bolts 43, said bracket being indicated generally at 44 provided with a rectangular enlargement 45 having an aperture to receive the end of the rectangular bar.

While I have illustrated and described my invention with some degree of particularity, nevertheless I realize that in practice various alterations thereover may be made and I therefore desire to reserve the right and privilege of changing the form of the details of construction, or otherwise altering the arrangement of the correlative parts without departing from the spirit of the invention or the scope of the appended claim.

Having thus described my invention, what I claim as new and desire to secure by Letters Patent is:—

In a vehicle, the combination of a pair of parallel bars rectangular in cross section, secured at their ends to opposite sides of the vehicle, a plurality of carriers slidably mounted on each bar, each carrier being boxlike in configuration and the under side cut away at both ends, rollers journaled in said cut away ends to engage the under side of the bars, rollers mounted in the carriers to engage the upper sides of the bars, tubular supports extending up from each carrier, inverted U-shaped members having their terminals engaged in opposed tubular supports, means connecting the tubular supports one to another, and means for moving the supports toward spaced relation or toward one end of the vehicle for the purpose set forth.

In testimony whereof I affix my signature in presence of two witnesses.

MICHAEL HANAWAY.

Witnesses:
JOHN W. JAMES,
LOIS H. JAMES.